(12) United States Patent
Bankhead (10) Patent No.: US 8,775,031 B1
(45) Date of Patent: Jul. 8, 2014

(54) AUTOMATIC INTERIOR REARVIEW MIRROR POSITIONING SYSTEM

(76) Inventor: Dietrich Bankhead, Atlanta, GA (US)

(*) Notice: Subject to any disclaimer, the term of this patent is extended or adjusted under 35 U.S.C. 154(b) by 0 days.

(21) Appl. No.: 13/329,309

(22) Filed: Dec. 18, 2011

Related U.S. Application Data (60) Provisional application No. 61/425,744, filed on Dec. 21, 2010.

(51) Int. Cl.
*B60N 2/02* (2006.01)

(52) U.S. Cl.
USPC .................. 701/49; 701/36; 701/22; 359/843

(58) Field of Classification Search
USPC .................................. 701/49, 36, 22; 359/843
See application file for complete search history.

(56) References Cited

U.S. PATENT DOCUMENTS

| | | | | |
|---|---|---|---|---|
| 5,694,259 | A * | 12/1997 | Brandin | 359/843 |
| 2006/0155444 | A1 * | 7/2006 | Lee et al. | 701/49 |
| 2006/0167606 | A1 * | 7/2006 | Malhas | 701/49 |
| 2010/0017071 | A1 * | 1/2010 | Ryu et al. | 701/49 |
| 2010/0039722 | A1 * | 2/2010 | Lee et al. | 359/843 |
| 2010/0087987 | A1 * | 4/2010 | Huang et al. | 701/36 |

* cited by examiner

*Primary Examiner* — Tuan C. To
*Assistant Examiner* — Jelani Smith (57) ABSTRACT

A rearview mirror control system for a vehicle that changes the rear viewing angle of an interior rearview mirror to eliminate blind spots. The control system receives inputs from a vehicle steering angle sensor, a vehicle yaw rate sensor, a vehicle speed sensor, a turn signal sensor, a global positioning system (GPS) receiver and map information and the vehicle operator's use of a switch housed on the vehicle's steering wheel apparatus.

7 Claims, 7 Drawing Sheets

AUTOMATIC INTERIOR REARVIEW MIRROR POSITIONING SYSTEM

CROSS-REFERENCE TO RELATED APPLICATIONS

This application claims the benefit of provisional patent application No. 61/425,744, filed 2010 Dec. 21 by the present inventor.

FEDERALLY SPONSORED RESEARCH

Not Applicable

SEQUENCE LISTING OR PROGRAM

Not Applicable

BACKGROUND

1. Field of Invention

This invention relates to the electronic operation and control of a vehicle's interior rearview mirror and a mirror control system for automatically adjusting the rear viewing angle of the interior rearview mirror to eliminate blind spots during certain vehicle operating conditions.

2. Prior Art

Currently, vehicles have used a three-mirror system to view the areas to the sides and rear of the vehicle. This system typically consists of two side rear viewing mirrors and one interior rearview mirror. Unfortunately, due to the location of these mirrors, this results in a limited sides and rear viewing areas. This system creates two blind spots of vision, one on the driver's side of the vehicle and the other on the passenger's side of the vehicle. In order to view the blind spots the driver has to turn his/her head, which takes the drivers attention away from the roadway in the front of the vehicle. This is safety hazard and endangers other vehicles on the road with the driver.

Thereafter several types of inventions were designed to address the driver and passenger side blind spot issue in such a way as to reveal the vehicle or objects located in them. U.S. Pat. No. 7,885,743 to Noro (2011) is an electric mirror control device provided with a proportionality constant conversion means for converting the proportionality constant of a detection output voltage to the angle of a mirror surface to be positive or negative. However, this is simply an electronic control system which uses a proportionality constant of the detection output voltage to the angle of the mirror surface and controls an up-down motor or a right-left motor. U.S. Pat. No. 7,810,939 to Foote (2010) is an electrically powered mirror unit adjustment mechanism that pivots a support arm between an extended position and a folded position, however it only moves the reflective mirror surface about horizontal and vertical axes. U.S. Pat. No. 7,373,249 to Ivanov (2008) describes a system where a method is disclosed for automatically controlling the position of a mirror to stabilize the view in the mirror in spite of changes in viewing position, however it only stabilizes the view in the rearview mirror after the mirror position has been set. U.S. Pat. No. 6,840,637 to Wang (2005) is an automobile exterior rearview mirror system in which adjustments by the vehicle operator to the driver side mirror are used to make automatic adjustments to the passenger side mirror without requiring the operator to make separate, independent adjustment of that mirror. Although this system minimizes the number of mirror adjustments it can only be used to adjust mirror system based on a predetermined mirror angle and distance position ratio of the passenger side view mirror relative to the driver side mirror. U.S. Pat. No. 7,780,299 to Martinson (2010) is a lateral-view mirror assembly comprising a housing having a first lateral-view mirror and a second lateral-view mirror coupled to a rear window of a vehicle and dimensioned to provide a driver of a vehicle with the ability to view objects positioned lateral to a rear portion of the vehicle by looking at a reflection of the objects reflected from the first and second lateral-view mirrors to the rearview mirror to the driver. This system can be used to spot vehicles in blind spots but depends on a mirror-to-mirror straight-line unobstructed view to the first and second lateral view mirrors to detect such objects. This is unlikely with backseat passengers and requires a huge adjustment for the vehicle operator from the traditional use of a rear view mirror, being the only reflective surface. U.S. Pat. No. 7,722,199 to DeWard (2010) discloses a rearview mirror system for a vehicle and includes an interior rearview mirror assembly having a mounting structure, an electrical actuator and a reflective element. However, this is only the mirror system, which includes the mirror, mounting structure and actuator used for moving the reflective element. There is no electronic system coupled with the mirror to provide the movement necessary to show blind spots to the vehicle operator. U.S. Pat. No. 7,517,099 to Hannah (2009) is a blind spot safety system that includes a side view mirror assembly. The side view mirror assembly includes a mirror housing attached to an automobile, a power supply, an adjustment motor, a mirror adjustment mechanism, and an adjustable mirror. A blind spot mirror track is incorporated into the mirror housing. However this involves a system compromised of a sliding mirror that moves along a track to reveal vehicle blind spots. The track is a component that is exposed to the elements and will require frequent maintenance to keep this system operational.

There have been a number of inventions that have made an effort to address driver and passenger blind spots. For example, U.S. Pat. No. 7,571,041 to Lee (2009), U.S. Pat. No. 7,354,166 to Qualich (2008,) U.S. Pat. No. 6,880,941 to Suggs (2005) and U.S. Pat. No. 5,126,885 to Gray (1992) are all electronically controlled motorized systems designed to operate vehicle side view mirrors by moving the angular position of said mirror to monitor both driver and passenger blind spots. However, the systems mentioned in the four aforementioned patents only control the side view mirrors and causes the driver to turn his/her head to view the side view mirrors which directs their eyes away from the front viewing area of the vehicle and forces the driver to use his/her peripheral view to pick up objects directly in front of the vehicle. This causes a reduction in reaction time and could potentially cause and accident. There isn't a way for the driver to manually control this system, which is another disadvantage. This system also requires the vehicle operator to control and view two mirrors Instead of one.

SUMMARY OF THE INVENTION

The present invention relates to an electronic vehicular rearview mirror control system, where the system automatically changes the rear viewing angle of a vehicle interior rearview mirror during certain vehicle operating conditions. The control system receives various vehicle inputs to determine if and when a vehicle driver will turn the vehicle, make a lane change, merge into a lane of traffic and a number of other maneuvers. The system receives input signals from one or more of a vehicle steering angle sensor, a vehicle yaw rate sensor, a vehicle speed sensor, a turn signal sensor, a global positioning system (GPS) receiver and map information. The system can also be controlled manually. The driver has the option of using a switch housed on the steering wheel apparatus that can move the mirror left or right to achieve the desired reflection angle. This proposed system eliminates both the driver and passenger side blind spots and gives the driver a 160 to 170 degree range of view to the sides and rear of the vehicle.

DRAWINGS

Figures

DRAWINGS

Reference Numerals

| 10 | three-lane road | 11 | outer lane |
| --- | --- | --- | --- |
| 12 | center lane | 13 | outer lane |
| 14 | vehicle | 15 | vehicle |
| 16 | driver side rearview mirror | 17 | interior rearview mirror |
| 18 | passenger side rearview mirror | 19 | vehicle |
| 20 | three-lane highway | 21 | inner lane |
| 22 | outer lane | 23 | center lane |
| 24 | vehicle | 25 | vehicle |
| 30 | vehicle operator | 32 | vehicle operator |
| 34 | normal rear viewing zone | 35 | vehicle operator |
| 36 | modified rear viewing zone | 37 | modified rear viewing zone |
| 42 | interior rearview mirror | 46 | interior rearview mirror |

-continued

| 47 | normal rear viewing zone | 48 | normal rear viewing zone |
| --- | --- | --- | --- |
| 52 | modified rear viewing zone | 60 | modified rear viewing zone |
| 61 | vehicle | 62 | inner lane |
| 64 | two-lane highway | 66 | vehicle |
| 68 | inner lane | 70 | two-lane highway |
| 80 | interior rearview mirror | 82 | normal rear viewing zone |
| 84 | modified rear viewing zone | 86 | vehicle operator |
| 88 | rearview mirror | 90 | normal rear viewing zone |
| 92 | modified rear viewing zone | 94 | vehicle operator |
| 100 | vehicle | 102 | right lane |
| 104 | two-lane highway | 106 | vehicle |
| 108 | merge lane | 110 | interior rearview mirror |
| 112 | normal rear viewing zone | 114 | modified rear viewing zone |
| 116 | rearview mirror | 118 | normal rear viewing zone |
| 120 | modified rear viewing zone | 122 | vehicle operator |
| 124 | vehicle operator | 126 | vehicle |
| 128 | interior rearview mirror assembly | 132 | steering wheel |
| 134 | front wheel | 136 | front wheel |
| 138 | flat mirror | 140 | rear and side field-of-view zone |
| 142 | normal rear viewing zone | 144 | vehicle operator |
| 146 | modified rear viewing zone | 148 | modified rear viewing zone |
| 150 | vehicle | 152 | steering wheel |
| 154 | front wheel | 156 | front wheel |
| 160 | interior rearview mirror | 162 | driver side rearview mirror |
| 164 | passenger side rearview mirror | 166 | mirror control system |
| 172 | turn signal | 174 | steering wheel switch |
| 176 | vehicle speed sensor | 178 | vehicle yaw rate sensor |
| 180 | GPS receiver | 182 | digital map information |
| 184 | steering angle sensor | 186 | steering column |
| 188 | turn signal sensor | 200 | flow chart diagram |
| 202 | box | 204 | box |
| 206 | box | 208 | decision diamond |
| 210 | box | 212 | decision diamond |
| 214 | box | 216 | decision diamond |
| 218 | box | 220 | decision diamond |
| 222 | box | 224 | decision diamond |
| 226 | box | 228 | decision diamond |
| 230 | box | 232 | box |
| 234 | box | 236 | box |

DETAILED DESCRIPTION OF THE INVENTION

Figure 1:
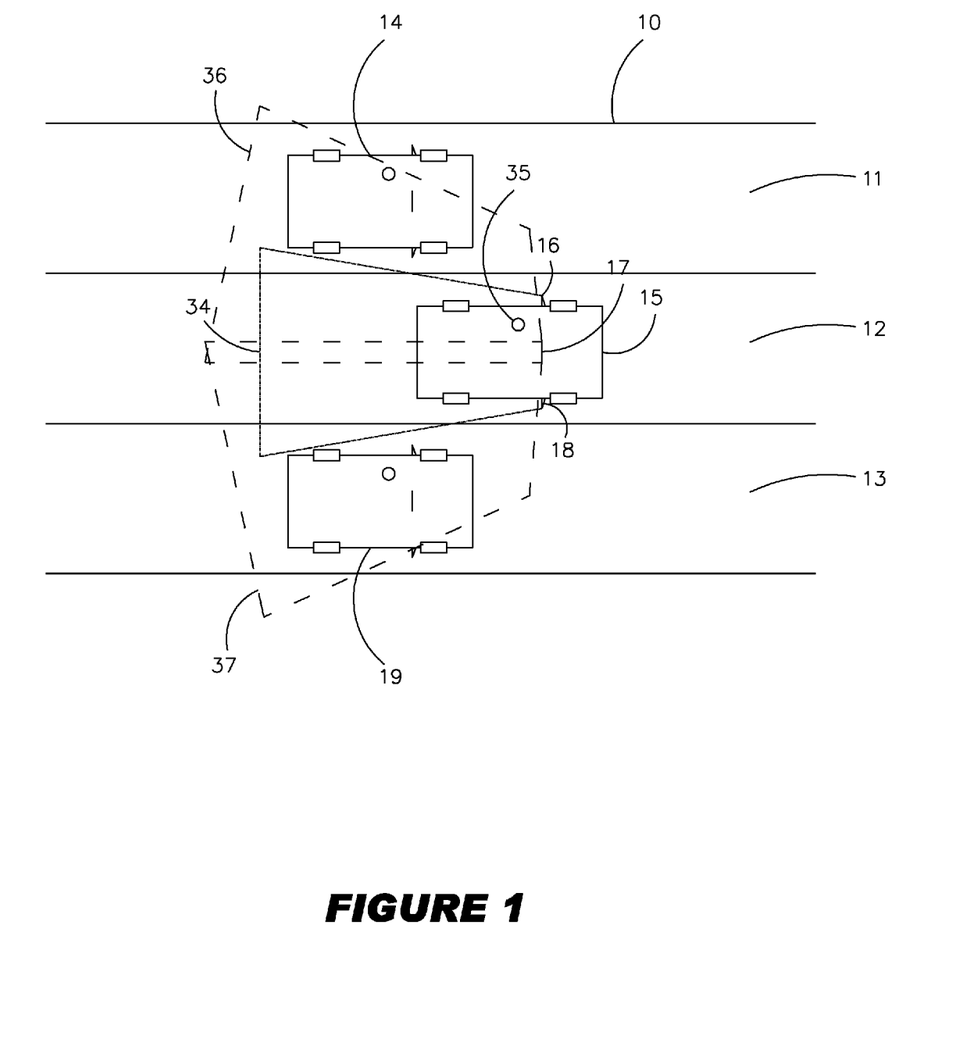
FIG. 1 is a plan view of three vehicles on a three-lane road, where the vehicle in the center lane shows a normal rear viewing zone and two modified rear viewing zones of a vehicle with a rearview mirror control system for automatically adjusting the rear viewing angle of the vehicle's interior rearview mirror, according to an embodiment of the present invention.

FIG. 1 is a plan view of three vehicles 14, 15 and 19 traveling on a three-lane road 10. The vehicle 15 is in a center lane 12 of the road 10. The vehicle 14 is in an outer lane 11 of the road 10, and the vehicle 19 is in an outer lane 13 of the road 10. The vehicle 15 includes a driver side rearview mirror 16 and a passenger side rearview mirror 18, and an interior rearview mirror 17. According to the invention, the interior rearview mirror 17 of the vehicle 15 automatically rotates to change the rear viewing zone of the mirror 17 to eliminate blind spots that exist outside of normal rear viewing zone 34. Particularly, the interior rearview mirror 17 of vehicle 15 automatically pivots a predetermined number of degrees from a normal rear viewing zone 34 to modified rear viewing zones 36 and 37. Therefore, a vehicle operator 35 operating the vehicle 15 will be able to better see the vehicle 14 and 19 in outer lanes 11 and 13.

Figure 2:
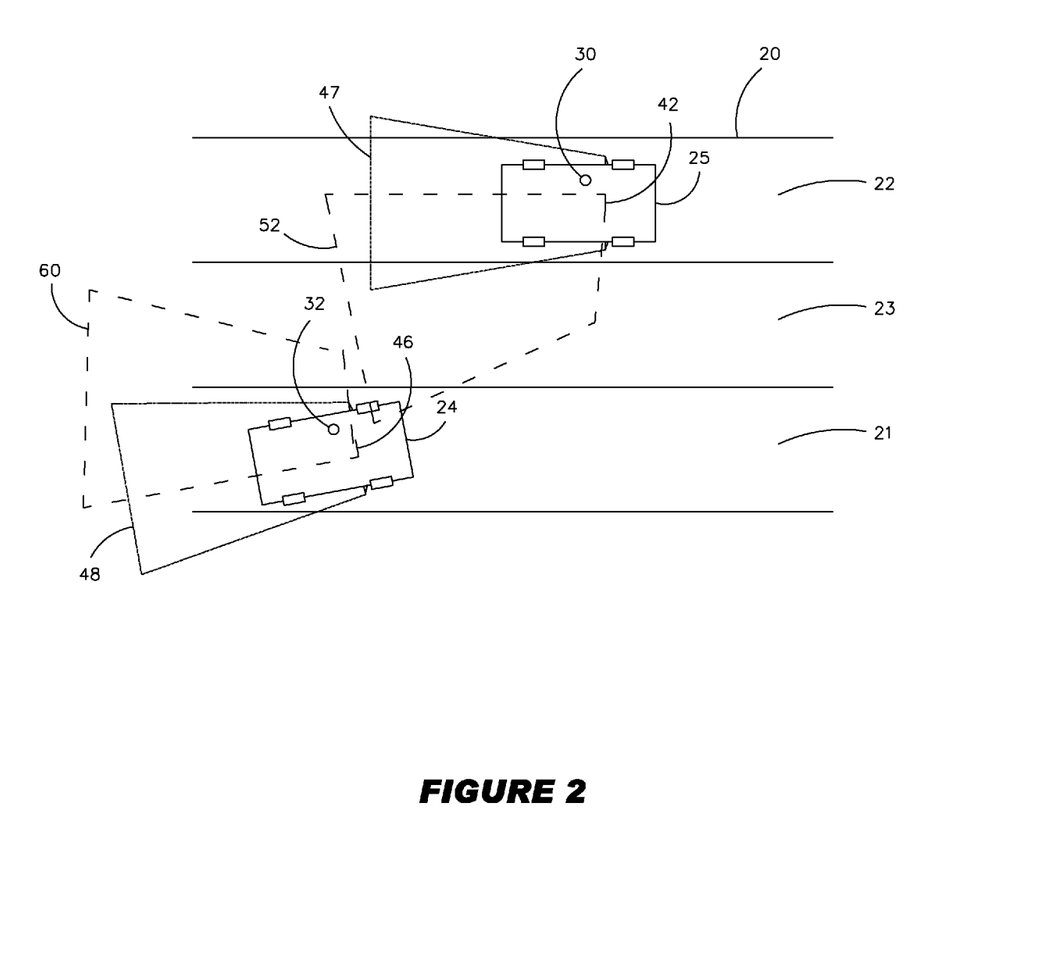
FIG. 2 is a plan view of two vehicles on a three-lane road, where both vehicles, in an outer and inner lane, employ a rearview mirror control system for automatically adjusting the rear viewing angle of the interior rearview mirror of the vehicle to eliminate potential blind spots, according to an embodiment of the present invention.

FIG. 2 is a plan view of a vehicle 25 traveling down an outer lane 22 of a three-lane highway 20 and a vehicle 24 traveling down an inner lane 21 of the highway 20. In this illustration, a vehicle operator 30 of the vehicle 25 and a vehicle operator 32 of the vehicle 24 both intend to make a lane change to a center lane 23 of the highway 20. When the vehicle operators 30 and 32 put on their respective turn signals, or turn the steering wheel to make the lane change, the interior rearview mirror 46 of the vehicle 24 is automatically adjusted from a normal rear viewing zone 48 to a modified rear viewing zone 60 to allow the vehicle operator 32 to better see into the center lane 23. Likewise, the interior rearview mirror 42 of the vehicle 25 is automatically adjusted from a normal rear viewing zone 47 to a modified rear viewing zone 52 to allow the vehicle operator 30 to better see the center lane 23 and the vehicle 24. In this illustration, the vehicle operator 32 has already begun to make the lane change from the lane 21 to the lane 23. Therefore, the vehicle operator 30 should yield to the vehicle 24. Because the rearview mirror 42 has been adjusted to the modified rear viewing zone 52, the vehicle operator 30 is better able to see the vehicle 24 moving into the center lane 23.

Figure 3:
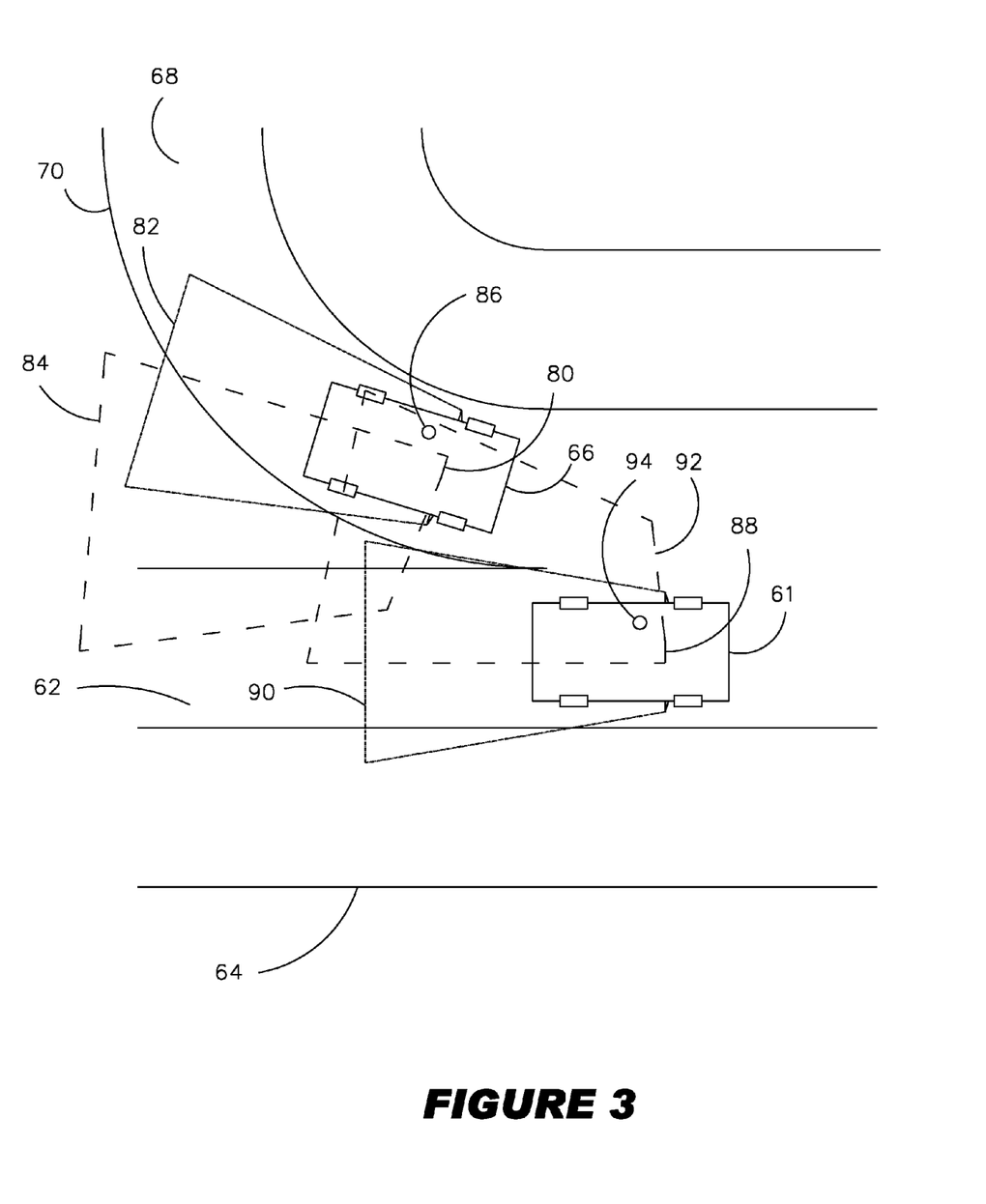
FIG. 3 is a plan view of two vehicles merging from two two-lane highways onto a three-lane highway, where the vehicles include an interior rearview mirror control system for automatically adjusting the rear viewing angle of the vehicle's interior rearview mirror to eliminate potential blind spots, according to an embodiment of the present invention.

FIG. 3 is a plan view of a vehicle 61 traveling down an inner lane 62 of a two-lane highway 64 and a vehicle 66 traveling down an inner lane 68 of a two-lane highway 70, where the two-lane highway 64 and 70 merge into a three-lane highway. In this scenario GPS and map information input adjusts the interior rearview mirror 80 of the vehicle 66, automatically pivoting the mirror outward from a normal rear viewing zone 82 to a modified rear viewing zone 84 as the vehicle 66 approaches the merge of the highways 64 and 70 so that a vehicle operator 86 can better see the lane 62 when the highways 64 and 70 merge. Likewise, a rearview mirror 88 of the vehicle 61 is automatically pivoted outward from a normal rear viewing zone 90 to a modified rear viewing zone 92 as the vehicle 60 approaches the merge of the highways 64 and 70 so that a vehicle operator 94 can better see the lane 68 and the vehicle 66. In this illustration, the vehicle 61 may have the right of way over the vehicle 66. By providing the modified rear viewing zone 92, the vehicle operator 94 may speed up the vehicle 61 to more safely enter the merge ahead of the vehicle 66.

Figure 4:
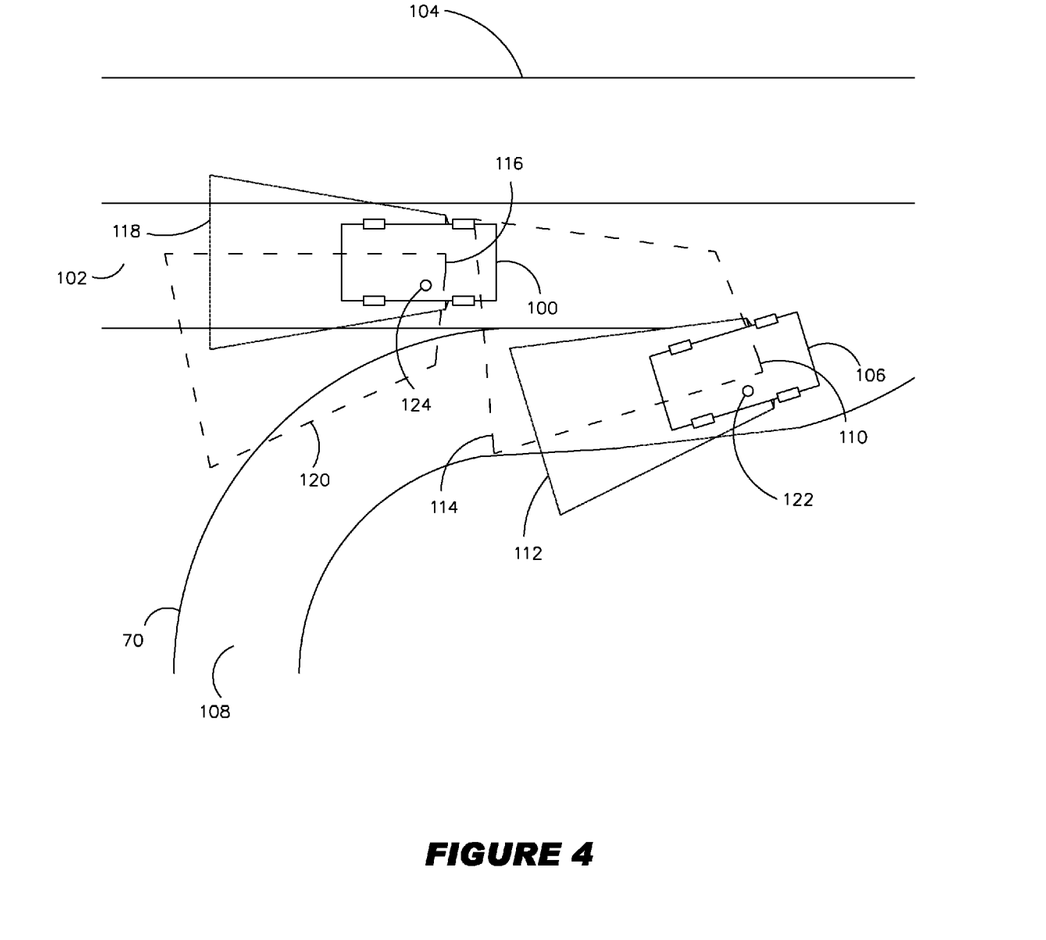
FIG. 4 is a plan view of two vehicles, where one vehicle is on a highway and the other vehicle is merging onto the highway, and both vehicles include an interior rearview mirror control system for automatically adjusting the rear viewing angle of the vehicle's interior rearview mirror to eliminate potential blind spots, according to an embodiment of the present invention.

FIG. 4 is a plan view of a vehicle 100 traveling down a right lane 102 of a two-lane highway 104. A vehicle 106 is entering the lane 102 from a merge lane 108. In this scenario GPS and map information input adjusts an interior rearview mirror 110 of the vehicle 106, automatically pivoting the mirror from a normal rear viewing zone 112 to a modified rear viewing zone 114 as the vehicle 106 merges onto the highway 104 so that a vehicle operator 122 can better see the lane 102 and the vehicle 100. Likewise, a rearview mirror 116 of the vehicle 100 is automatically pivoted from a normal rear viewing zone 118 to a modified rear viewing zone 120 to eliminate a potential blind spot and allow the vehicle operator 124 to better see the merge lane 108. In this illustration, the vehicle operator 124 should yield to the vehicle 106. By providing the modified rear viewing zone 114, the vehicle operator 122 is able to better see the vehicle 100, and take the appropriate driving maneuver, such as speeding up.

Figure 5:
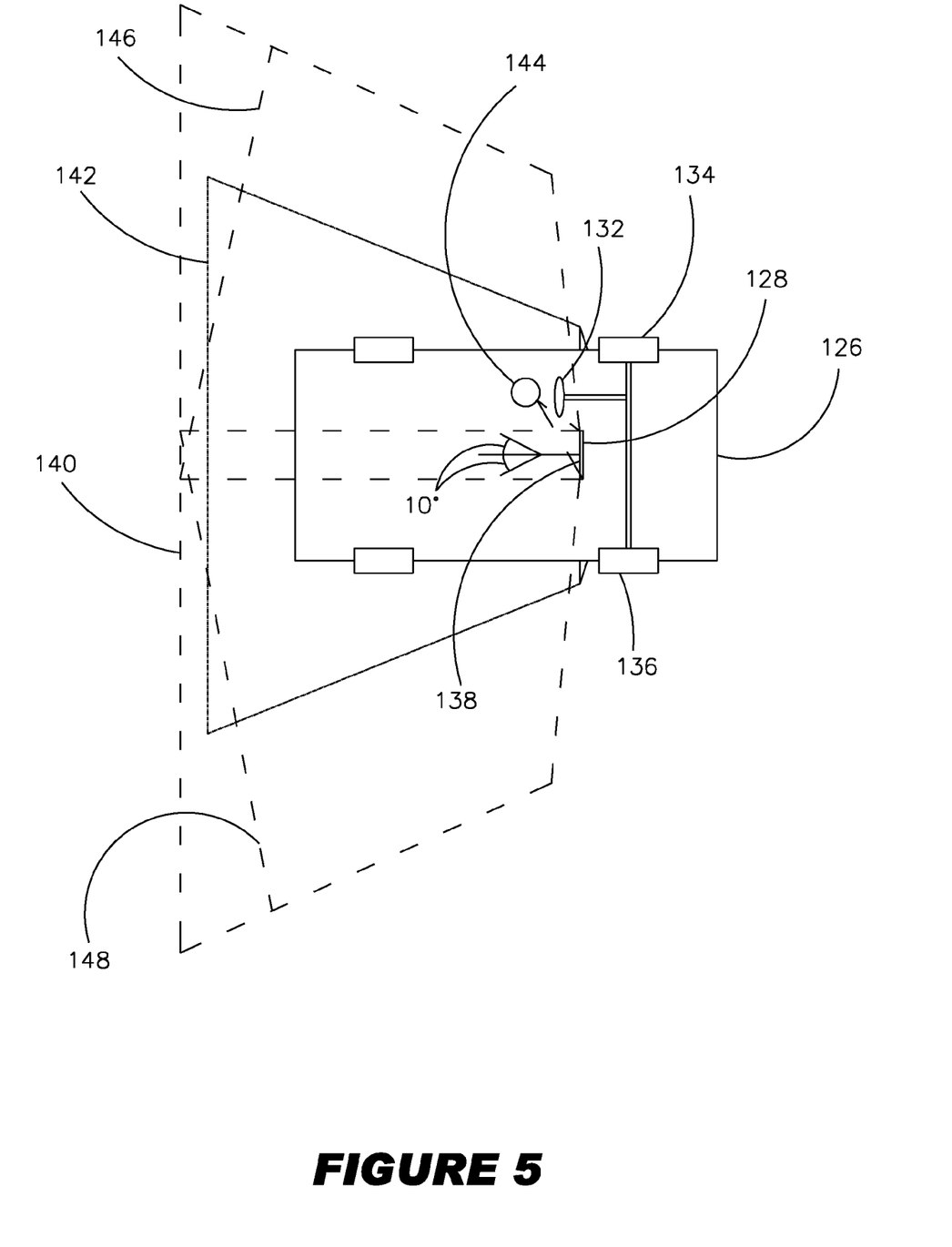
FIG. 5 is a plan view of a vehicle including an interior rearview mirror control system for rotating the interior rearview mirror of the vehicle, according to an embodiment of the present invention.

FIG. 5 is a plan view of a vehicle 126 including an interior rearview mirror assembly 128. The vehicle 126 also includes a steering wheel 132 for turning front wheels 134 and 136 of the vehicle 126. The interior rearview mirror assembly 128 includes a flat mirror 138 that is approximately 10 inches (254 mm) in length, and provides a vehicle operator 144 with a 160 to 170 degree rear and side field-of-view zone 140 behind and on the sides of vehicle 126 when operated from full left to full right positions. Mirror 138 rotates a predetermined amount, such as 10 degrees in both directions, from the normal rear viewing zone 142 to the modified rear viewing zones 146 and 148, according to one non-limiting embodiment of the present invention. The size of the normal rear viewing zone 142 remains the same. The 10 degree of mirror rotation, which moves the normal rear viewing zone 142 in both directions, creates the rear and side field-of-view zone 140.

Figure 6:
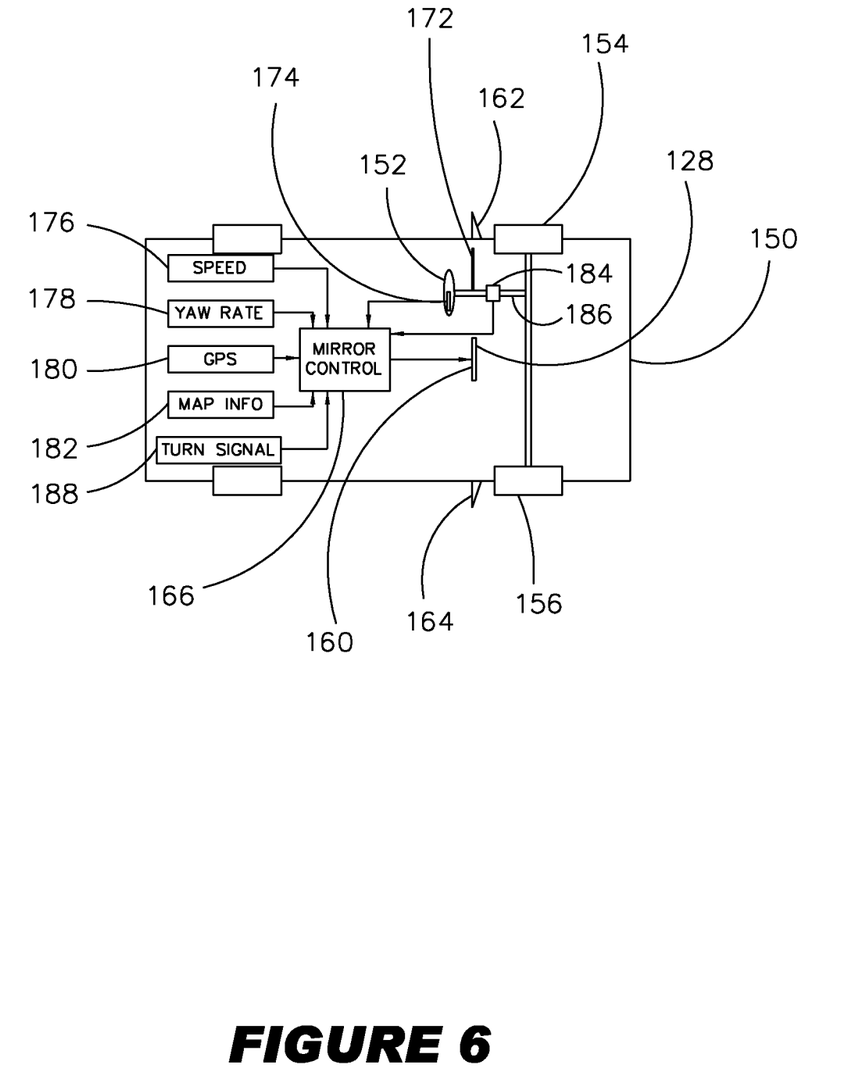
FIG. 6 is a block diagram plan view of a vehicle including a rearview mirror control system, according to an embodiment of the present invention.

FIG. 6 is a plan view of a vehicle 150 including a turn signal 172 and a vehicle steering wheel 152 for steering front wheels 154 and 156 of the vehicle 150. A steering angle sensor 184 is attached to a steering column 186 that is rotated when the steering wheel 152 is rotated to turn the wheels 154 and 156. The steering angle sensor 184 provides a signal of the amount of angular rotation to the mirror control system 166. The vehicle 150 includes an interior rearview mirror 160, a driver side rearview mirror 162 and passenger side rearview mirror 164. The rearview mirror 160 is pivoted to eliminate potential blind spots during lane changing, merging, turning, and other vehicle maneuvers, as discussed above. A rearview mirror control system 166 automatically controls the position of mirror 160 during these vehicle operating conditions. The rearview mirror control system 166 receives vehicle operation information from a vehicle speed sensor 176, a vehicle yaw rate sensor 178, a turn signal sensor 188, the output of a GPS receiver 180 and digital map information 182. Further, the rearview mirror control system 166 receives a signal from the steering angle signal from the steering angle sensor 184 and from the hand-operable steering wheel switch 174. All of the inputs to the rearview mirror control system 166 discussed above are available from known vehicle sensors and systems used for other vehicle systems, such as electronic stability control and a number of vehicle enhancement systems. The rearview mirror control system 166 uses the sensor signals to determine if and when the rear viewing zone of the rearview mirror 160 needs to be changed, consistent with the discussion above, to eliminate a potential blind spot. For example, if the rearview mirror control system 166 determines from map information and/or GPS information that a turn in the road is coming up, or a lane merge is coming up, or other change conditions are coming up along the route, the rearview mirror control system 166 will adjust the appropriate rear viewing zone of the mirror 160 before the event occurs to eliminate the potential blind spot. Likewise, if the vehicle operator turns on the turn signal or begins a turn for a lane change, lane merge, or any other change condition, the rearview mirror control system 166 can adjust the rear viewing zone of the mirror 160 accordingly to eliminate the potential blind spot. Also, the vehicle operator can manually override the rearview mirror control system sensors by pressing the hand-operable steering wheel switch 174, which adjusts the rear viewing zone of mirror 160 accordingly to eliminate the potential blind spot. Further, the rearview mirror control system 166 can use the steering angle signal, the vehicle speed signal and the vehicle yaw rate signal to determine the appropriate position of the mirror 160 for banked turns. The discussion above describes changing the rear viewing zones of the mirror 160 from a normal rear viewing position to a modified rear viewing position, and then back again. However, in an alternate embodiment, the rearview mirror control system 166 can selectively change the rear viewing angle of mirror 160 continuously over a range of angles or at several discreet rear viewing positions depending on the vehicle driving condition. The rearview mirror control system 166 can use a simple algorithm that adjusts the viewing angle of mirror 160 from a normal rear viewing zone to a modified rear viewing zone based on only a few inputs. Alternately, the rear view mirror control system 166 can employ a sophisticated algorithm that changes the rear viewing zones of mirror 160 over a predetermined range based on many inputs from the various sensors discussed above.

Figure 7:
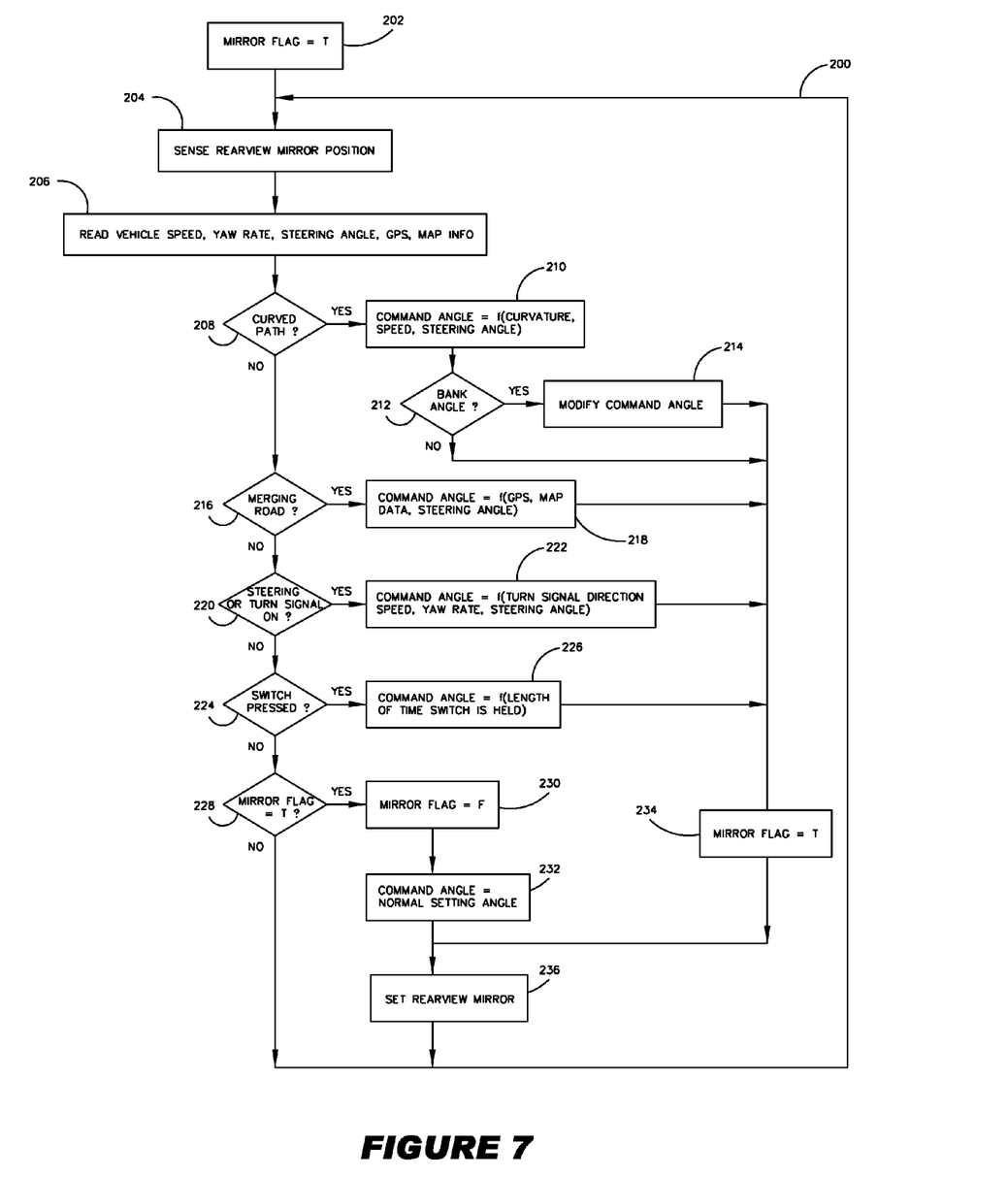
FIG. 7 is a flow chart diagram showing a process for adjusting the interior rearview mirror of a vehicle in response to certain input signals to eliminate potential blind spots, according to an embodiment of the present invention.

FIG. 7 is a flow chart diagram 200 showing one possible operation of the control algorithm for the rearview mirror control system 166 for controlling the position of the rearview mirror 160. The algorithm sets a mirror flag equal to true (T) at box 202. The algorithm then senses the position of the rearview mirror 160 at box 204 to determine whether it is in the normal rear viewing position or the modified rear viewing position. The algorithm determines whether the vehicle 150 is or will be traveling on a curved path at decision diamond 208 based on map and GPS receiver information. If the vehicle 150 is or will be traveling along a curved path, the algorithm then calculates a command signal for adjusting the rearview mirror 160 to change it's rear viewing position based on the amount of curvature of the path, the vehicle speed and/or the steering angle at box 210. If the curved path in the road is banked, then the rear viewing zone of the mirror 160 may need to be increased for the appropriate viewing angle. Therefore, the algorithm determines whether the curve in the road is banked at decision diamond 212. This information can be taken from map information, or by comparing the amount the vehicle operator is turning the steering wheel 152 to the actual vehicle yaw rate. If the turn is banked at the decision diamond 212, then the algorithm modifies the command angle at box 214 for a banked turn, and proceeds to set the mirror flag equal to true at the box 234 and sets the position of the rearview mirror 160 at box 236. The algorithm then returns to the box 204 to determine the position of the rearview mirror 160. If the algorithm determines that the vehicle 150 is not traveling on a curved path at the decision diamond 208, then the algorithm determines whether the vehicle 150 is merging onto a road at decision diamond 216. If the vehicle 150 is merging at the decision diamond 216, then the algorithm calculates the command signal for setting the position of the rearview mirror 160 at box 218 based on map information, GPS receiver information and/or the steering wheel angle signal. The algorithm then proceeds to set the mirror flag equal to true at the box 234 and sets the angle of the rearview mirror 160 at box 236. The algorithm then returns to the box 204 to determine the position of the rearview mirror 160. If the algorithm determines that the vehicle 150 is not traveling on a curved path at the decision diamond 208 and the vehicle 150 is not merging at decision diamond 216, then the algorithm determines whether the steering wheel 152 is turned or the turn signal is on at decision diamond 220 to determine if the vehicle operator is intending to make a right or left turn, such as for a lane change. If the hand-wheel 152 is turned or the turn signal is on at the decision diamond 220, then the algorithm calculates a command signal that determines the appropriate position of the rearview mirror 160 based on the direction of the turn signal, the vehicle speed, the vehicle yaw rate and/or the steering angle at box 222. The algorithm then sets the mirror flag equal to true at box 234 and sets the calculated position of the rearview mirror 160 at box 236. The algorithm then returns to the box 204 to determine the position of the rearview mirror 160.

If the algorithm determines that the vehicle 150 is not traveling on a curved path at the decision diamond 208, the vehicle 150 is not merging at the decision diamond 216 and the steering wheel 152 is not turned and the turn signal is not on at the decision diamond 220, the algorithm then determines whether the hand-operable steering wheel switch is pressed at decision diamond 224. If the switch is pressed, the algorithm then calculates a command signal for adjusting the rearview mirror 160 to change the rear viewing position based on the length of time the switch is held at box 226. If the switch is pressed and held at box 226, the algorithm modifies the mirror angle and proceeds to set the mirror flag equal to true at the box 234 and sets the position of the rearview mirror 160 at the box 236. The algorithm then returns to the box 204 to determine the position of the rearview mirror 160. If the algorithm determines that the vehicle 150 is not traveling on a curved path at the decision diamond 208, the vehicle 150 is not merging at the decision diamond 216, the steering wheel 152 is not turned and the turn signal is not on at the decision diamond 220 and the hand-operable steering wheel switch is not pressed at decision diamond 224, then the algorithm determines whether the mirror flag is set to true at decision diamond 228. If the mirror flag is set to true at the decision diamond 228, then the algorithm sets the mirror flag equal to false at box 230, generates a mirror angle/position command signal for the normal rearview zone at box 232 and sets the normal rear viewing angle at the box 236. The algorithm then proceeds to detect the position of the mirror 160 at the box 204, continually following through the flow chart 200 as the vehicle conditions change.

ADVANTAGES

From the description above, a number of embodiments of the rearview mirror control system become evident:

(a)

The vehicle operator doesn't have to change his/her head position to view images in the mirror. The position of the head stays forward which allows the driver to stay focused on the road ahead.

(b) With this system the preset degree of rotation reveals the entire blind spot on both the driver and passenger sides of the vehicle.

(c) The vehicle operator has manual control over the amount of angular rotation of the mirror.

(d) The rearview mirror control system is simple to operate with the use of a single switch to either set the switch to operate automatically which rotates the mirror to predetermined position that reveals blind spots or to set the switch for manual operation.

CONCLUSION, RAMIFICATIONS AND SCOPE

Accordingly, the reader will see that the rearview mirror control system of the various embodiments can be used to view driver and passenger side blind spots and can be operated easily. In addition, when the driver operates the vehicle they can also use the system during heavy traffic to determine if vehicles are in the driver or passenger blind spots to make lane changes to either the left or right lane. Furthermore, the rearview mirror control system has the additional advantages in that it provides safer roads by reducing the number of highway accidents it provides a direct correlation to the reduction in accidents by lowering the number of bodily injuries it could potentially change automobile body design by eliminating the need for side view mirrors resulting in reduced production time and costs Although the description above contains much specificity, these should not be constructed as limiting the scope of the embodiment but as merely providing illustrations of some of the presently preferred embodiments. For example, in the parked position the system can be used to observe back seat passengers, i.e. children.

Thus the scope of the embodiment should be determined by the appended claims and their legal equivalents, rather than by the examples alone.

Having now described my invention what I claim is:

1. A system for automatically adjusting a vehicle interior rearview mirror between a normal rear viewing zone and modified rear viewing zones based on predetermined vehicle operating conditions, said system comprising:

(a) a vehicle hand-operable steering wheel switch and a plurality of sensors for providing signals indicative of a vehicle turning and possible turning condition, (b) said plurality of sensors including a vehicle steering angle sensor,
(c) a vehicle yaw rate sensor,
(d) a vehicle speed sensor,
(e) a global positioning system (GPS) receiver and map information
(f) a vehicle turn signal sensor for providing a signal that a vehicle turn signal is on
(g) a rearview mirror controller for controlling the position of the interior rearview mirror, said rearview mirror controller being responsive to the switch and sensor signals and changing the rear viewing angle of the interior rearview mirror between the normal rear viewing zone and the modified rear viewing zones in response to turning of the vehicle, wherein the angle of the rearview mirror covers both side view mirror's field of view, therefore eliminating the need for side view mirrors.

2. The system according to claim 1 wherein the difference between the normal rear viewing zone and the modified rear viewing zone is approximately 20 degrees, full range of rotation, 10 degrees left and 10 degrees right.

3. The system according to claim 1 wherein the rearview mirror controller moves the interior rearview mirror to any location in a predetermined range of positions or variable positions if controlled manually by the steering wheel switch.

4. A vehicle comprising: an interior rearview mirror assembly including a mirror, said mirror being manually or automatically adjustable relative to the mirror assembly so as to change the rear viewing angle of the mirror; a vehicle hand-operable steering wheel switch for manually rotating the mirror a desired amount; a vehicle steering angle sensor to determine the vehicle steering wheel position, a vehicle yaw rate sensor to determine vehicle's yaw rate (angular velocity around its vertical axis); a vehicle speed sensor to determine vehicle speed, a global positioning system (GPS) receiver and map information to determine vehicle location and roadway information, a vehicle turn signal sensor for providing a signal that a vehicle turn signal is on; and a rearview mirror controller for controlling the position of the interior rearview mirror, said rearview mirror controller being responsive to the vehicle hand-operable steering wheel switch and signals from the vehicle steering angle sensor, vehicle yaw rate sensor, vehicle speed sensor, global positioning system (GPS) receiver and map information and the turn signal sensor, said rearview mirror controller setting the position of the interior rearview mirror based on the switch and sensor signals, wherein the rearview mirror controller moves the mirror from a normal rear viewing zone to modified rear viewing zones in response to pressing the steering wheel switch, turning of the vehicle or an anticipated turn of the vehicle and the vehicle merging into or changing lanes; wherein the angle of the rearview mirror covers both side view mirror's field of view, therefore eliminating the need for side view mirrors.

5. The vehicle according to claim 4 wherein the position of the interior rearview mirror is moved approximately 20 degrees.

6. The vehicle according to claim 4 wherein the rearview mirror controller moves the interior rearview mirror to any location in a predetermined range of positions or variable positions if controlled manually.

7. The vehicle according to claim 4 wherein the use of the system according to claim 1 eliminates the need for side view mirrors, whereby charming automobile body design by removing driver and passenger side view mirrors from vehicles resulting in reductions in vehicle production time and costs.

* * * * *